(12) United States Patent
Chen

(10) Patent No.: US 11,391,922 B2
(45) Date of Patent: Jul. 19, 2022

(54) LENS ASSEMBLY INCLUDING SEVEN LENSES OF --+++-+ REFRACTIVE POWERS

(71) Applicants: Sintai Optical (Shenzhen) Co., Ltd., ShenZhen (CN); Asia Optical Co., Inc., Taichung (TW)

(72) Inventor: Po-Yu Chen, Taichung (TW)

(73) Assignees: SINTAI OPTICAL (SHENZHEN) CO., LTD., Shenzhen (CN); ASIA OPTICAL CO., INC., Taichung (TW)

( * ) Notice: Subject to any disclaimer, the term of this patent is extended or adjusted under 35 U.S.C. 154(b) by 274 days.

(21) Appl. No.: 16/706,909

(22) Filed: Dec. 9, 2019

(65) Prior Publication Data
US 2020/0241248 A1    Jul. 30, 2020

(30) Foreign Application Priority Data

Jan. 28, 2019    (CN) .......................... 201910080685.8

(51) Int. Cl.
*G02B 13/00*    (2006.01)
*G02B 9/64*    (2006.01)

(52) U.S. Cl.
CPC ........... *G02B 13/0045* (2013.01); *G02B 9/64* (2013.01); *G02B 13/006* (2013.01)

(58) Field of Classification Search
CPC ................................ G02B 9/64; G02B 13/006
See application file for complete search history.

(56) References Cited

U.S. PATENT DOCUMENTS

| | | | |
|---|---|---|---|
| 2019/0187442 A1 | 6/2019 | Jia et al. | |
| 2021/0096328 A1* | 4/2021 | Wang | ....................... G02B 9/64 |

FOREIGN PATENT DOCUMENTS

| | | | |
|---|---|---|---|
| CN | 103777332 | A | 5/2014 |
| CN | 106291886 | A | 1/2017 |
| CN | 108445611 | A | 8/2018 |
| CN | 108469667 | A | 8/2018 |
| CN | 108761743 | A | 11/2018 |
| CN | 208270838 | U | 12/2018 |
| JP | 2018159898 | A | 10/2018 |

OTHER PUBLICATIONS

Chinese Language Office Action of China Invention Patent Application No. 201910080685.8 from SIPO dated Mar. 30, 2021.

* cited by examiner

*Primary Examiner* — Wen Huang
(74) *Attorney, Agent, or Firm* — McClure, Qualey & Rodack, LLP

(57) ABSTRACT

A lens assembly includes a first lens, a second lens, a third lens, a fourth lens, a fifth lens, a sixth lens, and a seventh lens, all of which are arranged in order from an object side to an image side along an optical axis. The first lens is with negative refractive power and includes a convex surface facing the object side. The second lens is with negative refractive power. The third lens is with positive refractive power. The fourth lens is with positive refractive power. The fifth lens is with positive refractive power. The sixth lens is with negative refractive power. The seventh lens is with positive refractive power and includes a convex surface facing the object side. The second lens and the third lens are cemented.

6 Claims, 16 Drawing Sheets

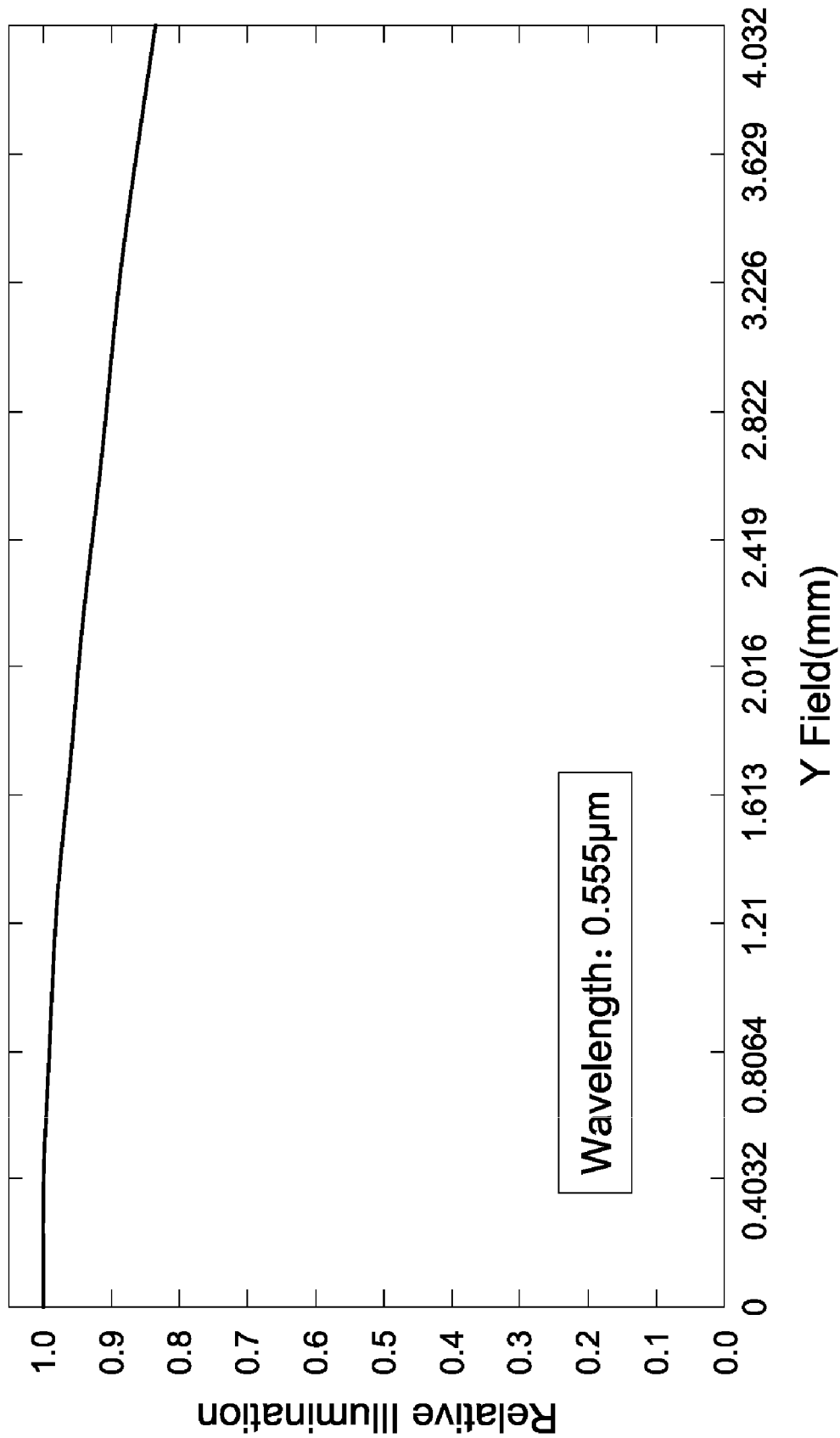

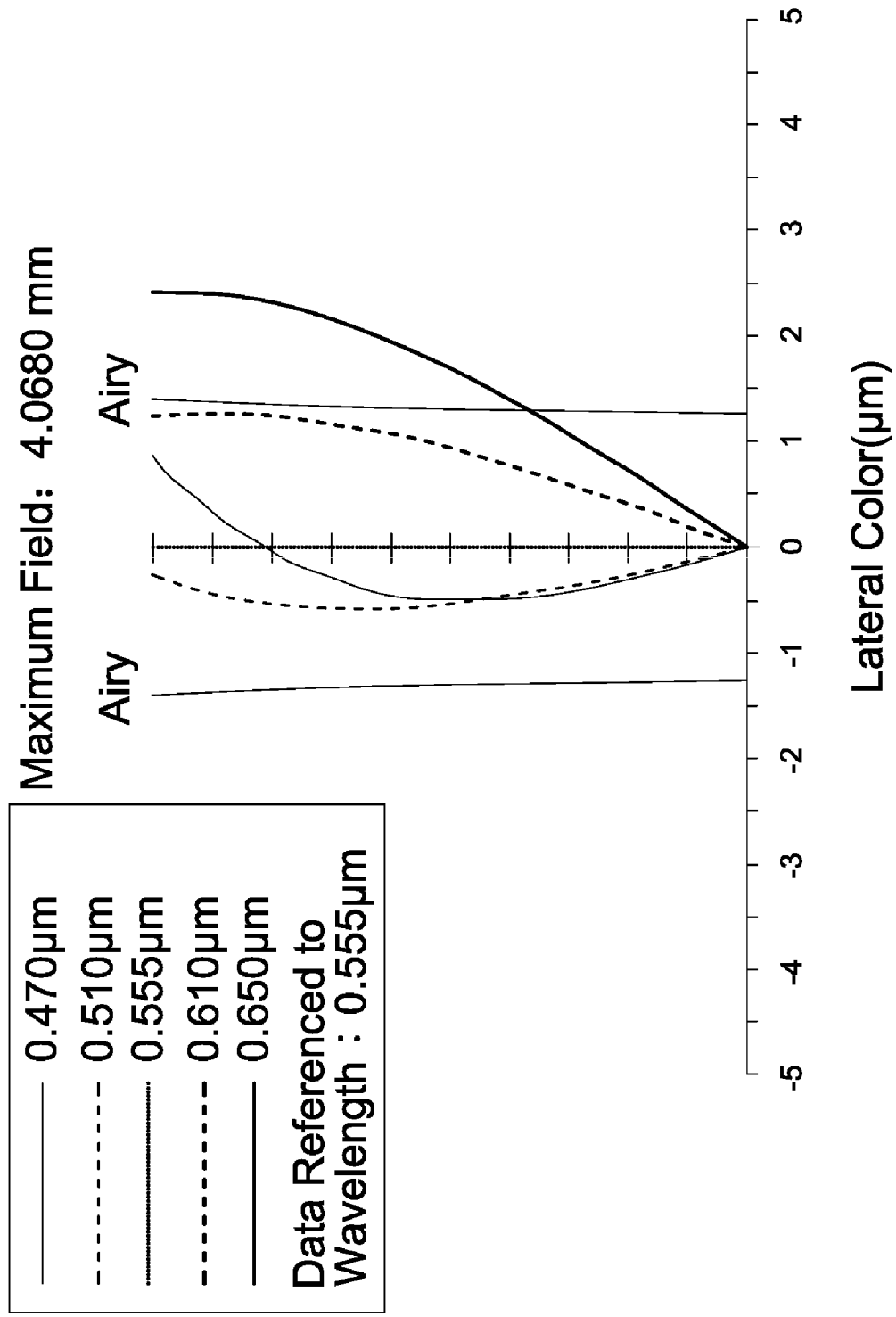

LENS ASSEMBLY INCLUDING SEVEN LENSES OF −−+++−+ REFRACTIVE POWERS

CROSS REFERENCE TO RELATED APPLICATIONS

This application claims priority of China Patent Application No. 201910080685.8, filed on Jan. 28, 2019, the entirety of which is incorporated by reference herein.

BACKGROUND OF THE INVENTION

Field of the Invention

The invention relates to a lens assembly.

Description of the Related Art

The current development trend of a lens assembly is toward miniaturization. Additionally, the lens assembly is developed to have small F-number, high resolution, and resistance to environmental temperature change in accordance with different application requirements. However, the known lens assembly can't satisfy such requirements. Therefore, the lens assembly needs a new structure in order to meet the requirements of miniaturization, small F-number, high resolution, and resistance to environmental temperature change at the same time.

BRIEF SUMMARY OF THE INVENTION

The invention provides a lens assembly to solve the above problems. The lens assembly of the invention is provided with characteristics of a shortened total lens length, a decreased F-number, an increased resolution, a resisted environmental temperature change, and still has a good optical performance.

The lens assembly in accordance with an exemplary embodiment of the invention includes a first lens, a second lens, a third lens, a fourth lens, a fifth lens, a sixth lens, and a seventh lens, all of which are arranged in order from an object side to an image side along an optical axis. The first lens is with negative refractive power and includes a convex surface facing the object side. The second lens is with negative refractive power. The third lens is with positive refractive power. The fourth lens is with positive refractive power. The fifth lens is with positive refractive power. The sixth lens is with negative refractive power. The seventh lens is with positive refractive power and includes a convex surface facing the object side. The second lens and the third lens are cemented.

The lens assembly in accordance with another exemplary embodiment of the invention includes a first lens, a second lens, a third lens, a fourth lens, a fifth lens, a sixth lens, and a seventh lens, all of which are arranged in order from an object side to an image side along an optical axis. The first lens is with negative refractive power and includes a convex surface facing the object side. The second lens is with negative refractive power. The third lens is with positive refractive power. The fourth lens is with positive refractive power. The fifth lens is with positive refractive power. The sixth lens is with negative refractive power. The seventh lens is with positive refractive power and includes a convex surface facing the object side. The lens assembly satisfies: $0.3<f/TTL<0.4$; wherein f is an effective focal length of the lens assembly and TTL is an interval from the convex surface of the first lens to an image plane along the optical axis.

In another exemplary embodiment, the fifth lens and the sixth lens are cemented.

In yet another exemplary embodiment, the first lens further includes a concave surface facing the image side, the second lens includes a concave surface facing the object side, the third lens includes a convex surface facing the image side, the fourth lens is a biconvex lens and includes a convex surface facing the object side and another convex surface facing the image side, the fifth lens includes a convex surface facing the object side, the sixth lens includes a concave surface facing the image side, and the seventh lens further includes a convex surface facing the image side.

In another exemplary embodiment, the second lens further includes another concave surface facing the image side, the third lens further includes another convex surface facing the object side, the fifth lens further includes another convex surface facing the image side, and the sixth lens further includes another concave surface facing the object side.

In yet another exemplary embodiment, the second lens further includes a convex surface facing the image side, the third lens further includes a concave surface facing the object side, the fifth lens further includes a concave surface facing the image side, and the sixth lens further includes a convex surface facing the object side.

In another exemplary embodiment, the lens assembly satisfies: $2.2<|f_1/f|<4.2$; $0.1<|f_2/f|<2.2$; wherein $f_1$ is an effective focal length of the first lens, $f_2$ is an effective focal length of the second lens, and f is an effective focal length of the lens assembly.

In yet another exemplary embodiment, the lens assembly satisfies: $0.5<|f_4/f|<2.6$; wherein $f_4$ is an effective focal length of the fourth lens and f is an effective focal length of the lens assembly.

In another exemplary embodiment, the lens assembly satisfies: $0.3<|f_6/f|<1.2$; wherein $f_6$ is an effective focal length of the sixth lens and f is an effective focal length of the lens assembly.

In yet another exemplary embodiment, the lens assembly satisfies: $0.9<|f_7/f|<3.1$; wherein $f_7$ is an effective focal length of the seventh lens and f is an effective focal length of the lens assembly.

In another exemplary embodiment, the lens assembly satisfies: $0.1<BFL/TTL<0.4$; wherein BFL is an interval from an image side surface of the seventh lens to an image plane along the optical axis and TTL is an interval from the convex surface of the first lens to the image plane along the optical axis.

In yet another exemplary embodiment, the second lens and the third lens are cemented and the fifth lens and the sixth lens are cemented.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 2E is a relative illumination diagram of the lens assembly in accordance with the first embodiment of the invention

FIG. 4D is a lateral color diagram of the lens assembly in accordance with the second embodiment of the invention;

DETAILED DESCRIPTION OF THE INVENTION

The following description is made for the purpose of illustrating the general principles of the invention and should not be taken in a limiting sense. The scope of the invention is best determined by reference to the appended claims.

The present invention provides a lens assembly including a first lens, a second lens, a third lens, a fourth lens, a fifth lens, a sixth lens, and a seventh lens. The first lens is with negative refractive power and includes a convex surface facing an object side. The second lens is with negative refractive power. The third lens is with positive refractive power. The fourth lens is with positive refractive power. The fifth lens is with positive refractive power. The sixth lens is with negative refractive power. The seventh lens is with positive refractive power and includes a convex surface facing the object side. The first lens, the second lens, the third lens, the fourth lens, the fifth lens, the sixth lens, and the seventh lens are arranged in order from the object side to an image side along an optical axis. The second lens and the third lens are cemented.

The present invention provides another lens assembly including a first lens, a second lens, a third lens, a fourth lens, a fifth lens, a sixth lens, and a seventh lens. The first lens is with negative refractive power and includes a convex surface facing an object side. The second lens is with negative refractive power. The third lens is with positive refractive power. The fourth lens is with positive refractive power. The fifth lens is with positive refractive power. The sixth lens is with negative refractive power. The seventh lens is with positive refractive power and includes a convex surface facing the object side. The first lens, the second lens, the third lens, the fourth lens, the fifth lens, the sixth lens, and the seventh lens are arranged in order from the object side to an image side along an optical axis. The lens assembly satisfies: $0.3<f/TTL<0.4$; wherein f is an effective focal length of the lens assembly and TTL is an interval from the convex surface of the first lens to an image plane along the optical axis.

Referring to Table 1, Table 2, Table 4, and Table 5, wherein Table 1 and Table 4 show optical specifications in accordance with a first and second embodiments of the invention respectively and Table 2 and Table 5 show aspheric coefficients of each aspheric surface in Table 1 and Table 4 respectively.

Figure 1:
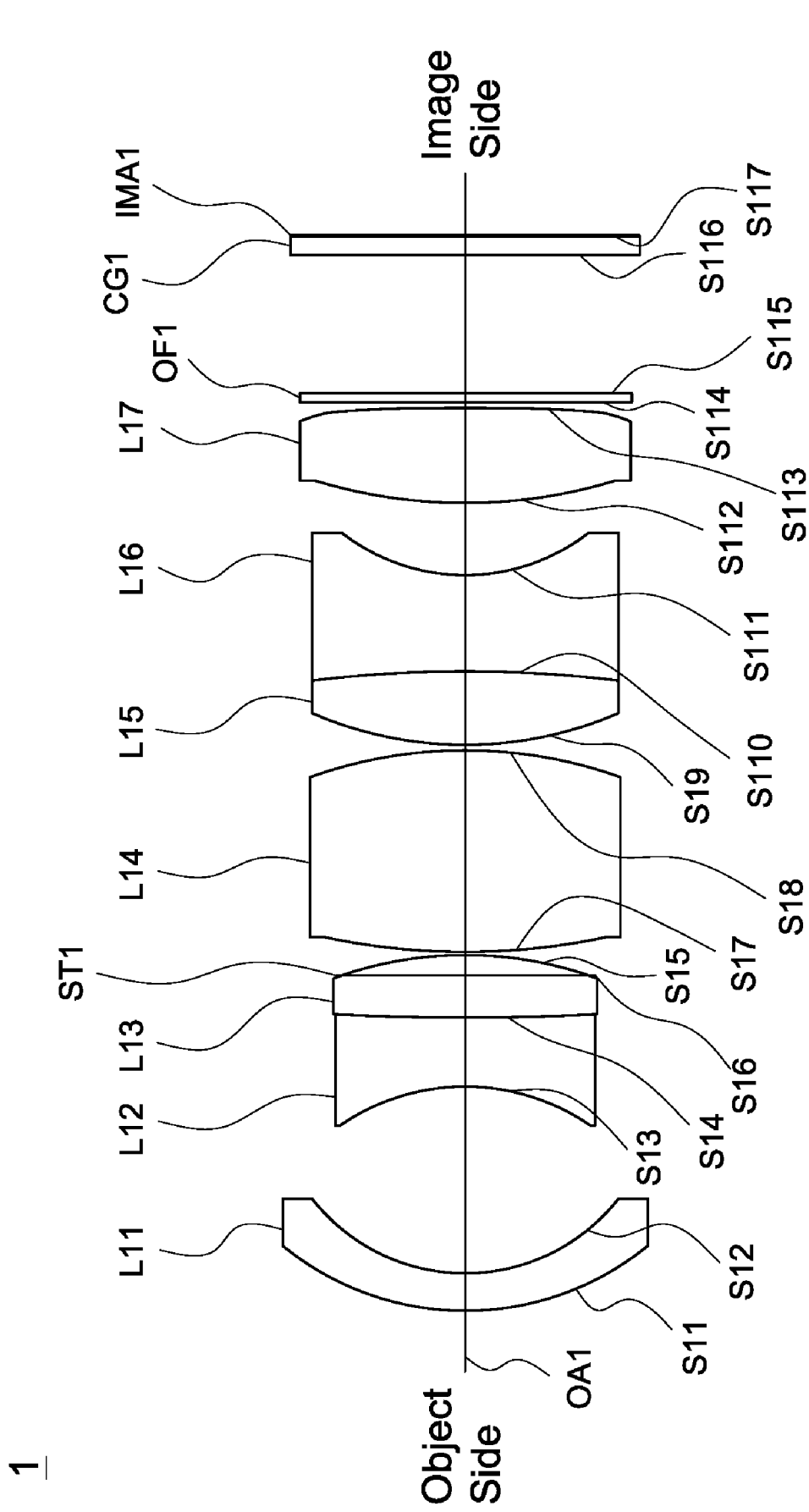
FIG. 1 is a lens layout diagram of a lens assembly in accordance with a first embodiment of the invention.
Figure 3:
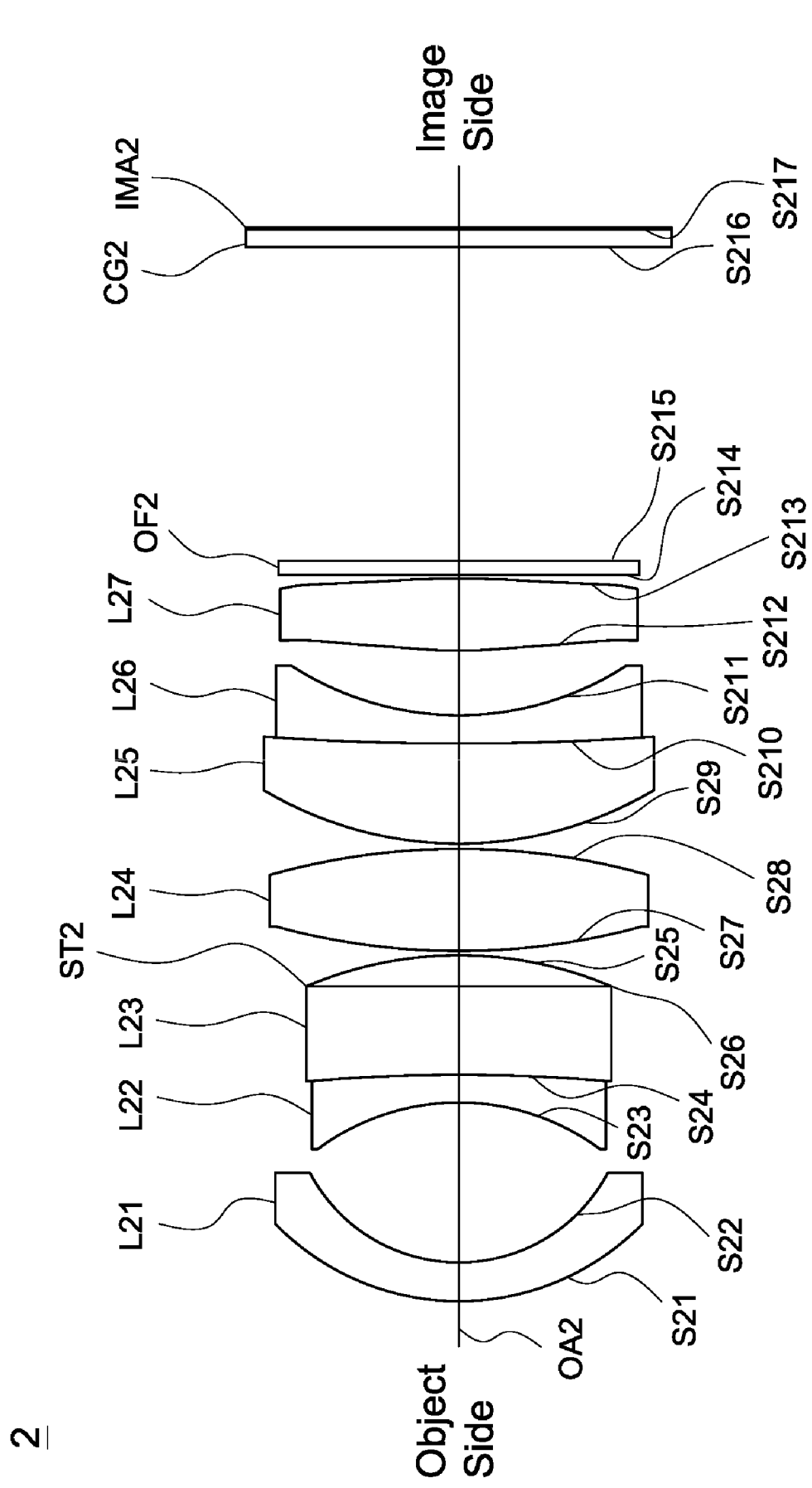
FIG. 3 is a lens layout diagram of a lens assembly in accordance with a second embodiment of the invention.

FIG. 1 and FIG. 3 are lens layout diagrams of the lens assembly in accordance with the first and second embodiments of the invention respectively.

The first lens L11, L21 are with negative refractive power and made of glass material, wherein the object side surfaces S11, S21 are convex surfaces and the object side surfaces S11, S21 and the image side surfaces S12, S22 are spherical surfaces.

The second lens L12, L22 are with negative refractive power and made of glass material, wherein the object side surfaces S13, S23 and the image side surfaces S14, S24 are spherical surfaces.

The third lens L13, L23 are with positive refractive power and made of glass material, wherein the object side surfaces S14, S24 and the image side surfaces S15, S25 are spherical surfaces.

The second lens L12, L22 and the third lens L13, L23 are cemented respectively.

The fourth lens L14, L24 are with positive refractive power and made of glass material, wherein the object side surfaces S17, S27 and the image side surfaces S18, S28 are aspheric surfaces.

The fifth lens L15, L25 are with positive refractive power and made of glass material, wherein the object side surfaces S19, S29 and the image side surfaces S110, S210 are spherical surfaces.

The sixth lens L16, L26 are with negative refractive power and made of glass material, wherein the object side surfaces S110, S210 and the image side surfaces S111, S211 are spherical surfaces.

The fifth lens L15, L25 and the sixth lens L16, L26 are cemented respectively.

The seventh lens L17, L27 are with positive refractive power and made of glass material, wherein the object side surfaces S112, S212 are convex surfaces and the object side surfaces S112, S212 and the image side surfaces S113, S213 are aspheric surfaces.

In addition, the lens assembly 1, 2 satisfy at least one of the following conditions:

$$0.1<|f_2/f|<2.2; \quad (1)$$

$$0.3<|f_6/f|<1.2; \quad (2)$$

$$2.2<|f_1/f|<4.2; \quad (3)$$

$$0.5<|f_4/f|<2.6; \quad (4)$$

$$0.9<|f_7/f|<3.1; \quad (5)$$

$$0.1<BFL/TTL<0.4; \quad (6)$$

$$0.3<f/TTL<0.4; \quad (7)$$

wherein f is an effective focal length of the lens assembly 1, 2 for the first to second embodiments, $f_1$ is an effective focal length of the first lens L11, L21 for the first to second embodiments, $f_2$ is an effective focal length of the second lens L12, L22 for the first to second embodiments, $f_4$ is an effective focal length of the fourth lens L14, L24 for the first to second embodiments, $f_6$ is an effective focal length of the sixth lens L16, L26 for the first to second embodiments, $f_7$ is an effective focal length of the seventh lens L17, L27 for the first to second embodiments, BFL is an interval from the image side surface S113, S213 of the seventh lens L17, L27 to the image plane IMA1, IMA2 along the optical axis OA1, OA2 for the first to second embodiments, and TTL is an interval from the object side surface S11, S21 of the first lens L11, L21 to the image plane IMA1, IMA2 along the optical axis OA1, OA2 for the first to second embodiments. Making the lens assembly 1, 2 can effectively shorten the total lens length, effectively decrease F-number, effectively increase resolution, effectively resistance to environmental temperature change, and effectively correct aberration.

A detailed description of a lens assembly in accordance with a first embodiment of the invention is as follows. Referring to FIG. 1, the lens assembly 1 includes a first lens L11, a second lens L12, a third lens L13, a stop ST1, a fourth lens L14, a fifth lens L15, a sixth lens L16, a seventh lens L17, an optical filter OF1, and a cover glass CG1, all of which are arranged in order from an object side to an image side along an optical axis OA1. In operation, an image of light rays from the object side is formed at an image plane IMA1.

As described above, wherein: the first lens L11 is a meniscus lens, wherein the image side surface S12 is a concave surface; the second lens L12 is a biconcave lens, wherein the object side surface S13 is a concave surface and the image side surface S14 is a concave surface; the third lens L13 is a biconvex lens, wherein the object side surface S14 is a convex surface and the image side surface S15 is a convex surface; the fourth lens L14 is a biconvex lens, wherein the object side surface S17 is a convex surface and the image side surface S18 is a convex surface; the fifth lens L15 is biconvex lens, wherein the object side surface S19 is a convex surface and the image side surface S110 is a convex surface; the sixth lens L16 is a biconcave lens, wherein the object side surface S110 is a concave surface and the image side surface S111 is a concave surface; the seventh lens L17 is a biconvex lens, wherein the image side surface S113 is a convex surface; both of the object side surface S114 and image side surface S115 of the optical filter OF1 are plane surfaces; and both of the object side surface S116 and image side surface S117 of the cover glass CG1 are plane surfaces.

With the above design of the lenses and stop ST1 and at least any one of the conditions (1)-(7) satisfied, the lens assembly 1 can have an effective shortened total lens length, an effective decreased F-number, an effective increased resolution, an effective resisted environmental temperature change, and is capable of an effective corrected aberration.

Table 1 shows the optical specification of the lens assembly 1 in FIG. 1.

TABLE 1

| Effective Focal Length = 9.659 mm Total Lens Length = 29.914 mm Vertical | | | | | F-number = 1.8 Field of View = 26.7 Degrees | |
|---|---|---|---|---|---|---|
| Surface Number | Radius of Curvature (mm) | Thickness (mm) | Nd | Vd | Effective Focal Length (mm) | Remark |
| S11 | 8.230236 | 0.993585 | 1.517 | 64.17 | −35.173 | The First Lens L11 |
| S12 | 5.436536 | 5.235755 | | | | |
| S13 | −6.32947 | 1.912642 | 1.548 | 45.82 | −10.438 | The Second Lens L12 |
| S14 | 68.76904 | 1.737481 | 1.835 | 42.73 | 11.274 | The Third Lens L13 |
| S15 | −10.832 | −0.56195 | | | | |
| S16 | ∞ | 0.65713 | | | | Stop ST1 |
| S17 | 17.63981 | 5.65805 | 1.595 | 67.74 | 12.946 | The Fourth Lens L14 |
| S18 | −11.9896 | 0.1 | | | | |
| S19 | 11.48377 | 2.041971 | 1.835 | 42.73 | 10.958 | The Fifth Lens L15 |
| S110 | −42.1979 | 2.679844 | 1.847 | 23.78 | −5.730 | The Sixth Lens L16 |
| S111 | 5.690214 | 2.004926 | | | | |
| S112 | 15.09027 | 2.625584 | 1.678 | 54.89 | 18.501 | The Seventh Lens L17 |
| S113 | −67.6377 | 0.2 | | | | |
| S114 | ∞ | 0.2 | 1.517 | 64.17 | | Optical Filter OF1 |
| S115 | ∞ | 3.879053 | | | | |
| S116 | ∞ | 0.5 | 1.517 | 64.17 | | Cover Glass CG1 |
| S117 | ∞ | 0.05 | | | | |

The aspheric surface sag z of each aspheric surface in table 1 can be calculated by the following formula:

$$z=ch^2/\{1+[1-(k+1)c^2h^2]^{1/2}\}+Ah^4+Bh^6+Ch^8+Dh^{10}$$

where c is curvature, h is the vertical distance from the lens surface to the optical axis, k is conic constant and A, B, C and D are aspheric coefficients.

In the first embodiment, the conic constant k and the aspheric coefficients A, B, C, D of each aspheric surface are shown in Table 2.

TABLE 2

| Surface Number | k | A | B | C | D |
|---|---|---|---|---|---|
| S17 | −1.95047 | −5.43E−02 | −5.43E−04 | −6.27E−05 | 2.76E−06 |
| S18 | −0.46989 | 0.129 | −2.75E−02 | −5.95E−04 | 1.19E−06 |
| S112 | −11.5917 | 0.61 | −7.85E−05 | 6E−07 | −1.96E−08 |
| S113 | 64.97372 | 0.0489 | −3.13E−02 | 1.37E−04 | −2.85E−05 |

Table 3 shows the parameters and condition values for conditions (1)-(7) in accordance with the first embodiment of the invention. It can be seen from Table 3 that the lens assembly 1 of the first embodiment satisfies the conditions (1)-(7).

TABLE 3

| BFL | 4.829 mm | | | | |
|---|---|---|---|---|---|
| $|f_2/f|$ | 1.08 | $|f_6/f|$ | 0.59 | $|f_1/f|$ | 3.64 |
| $|f_4/f|$ | 1.34 | $|f_7/f|$ | 1.92 | BFL/TTL | 0.16 |
| f/TTL | 0.32 | | | | |

By the above arrangements of the lenses and stop ST1, the lens assembly 1 of the first embodiment can meet the requirements of optical performance as seen in FIGS. 2A-2G.

Figure 2A:
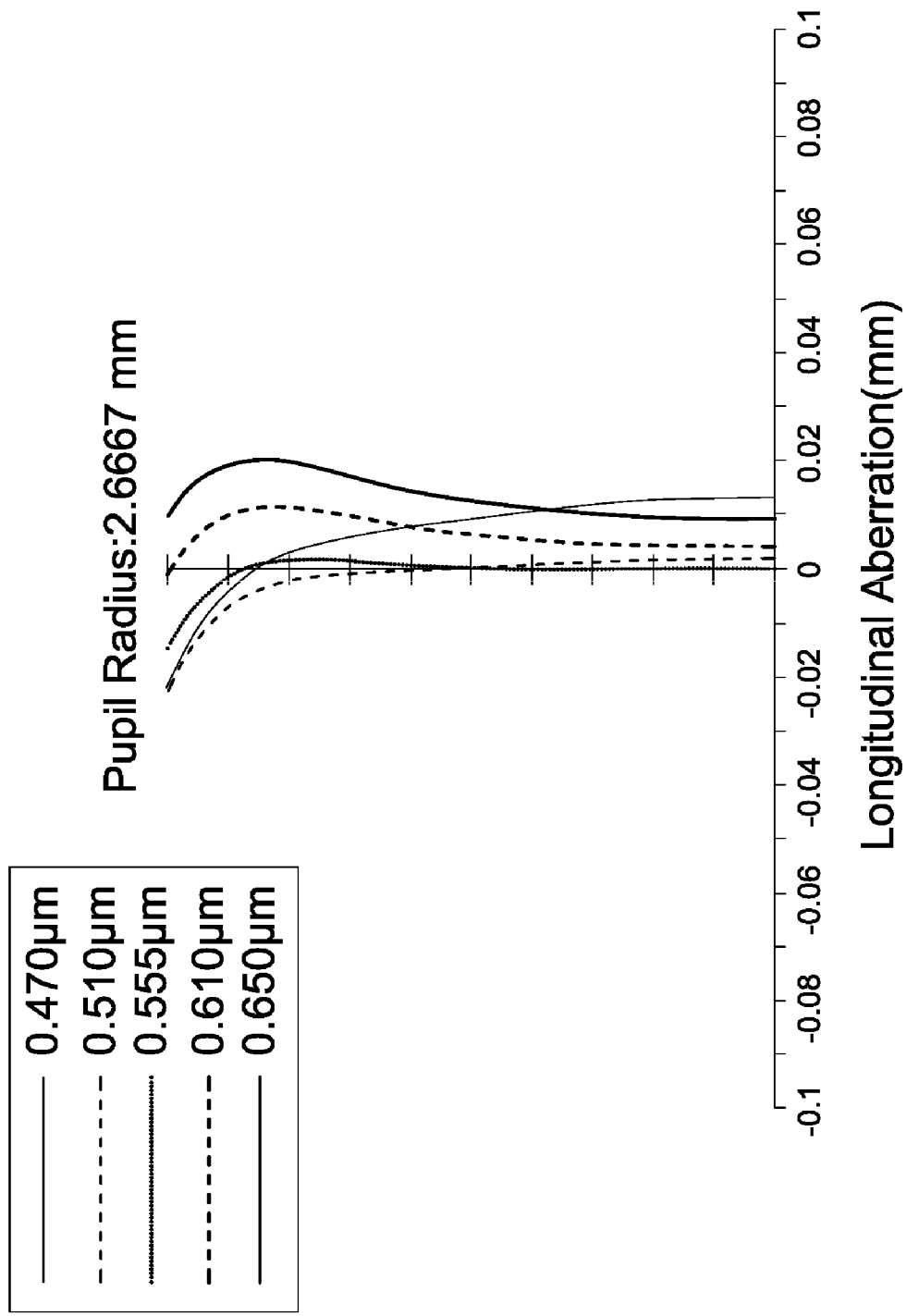
FIG. 2A depicts a longitudinal aberration diagram of the lens assembly in accordance with the first embodiment of the invention.

It can be seen from FIG. 2A that the longitudinal aberration in the lens assembly 1 of the first embodiment ranges from −0.03 mm to 0.02 mm.

Figure 2B:
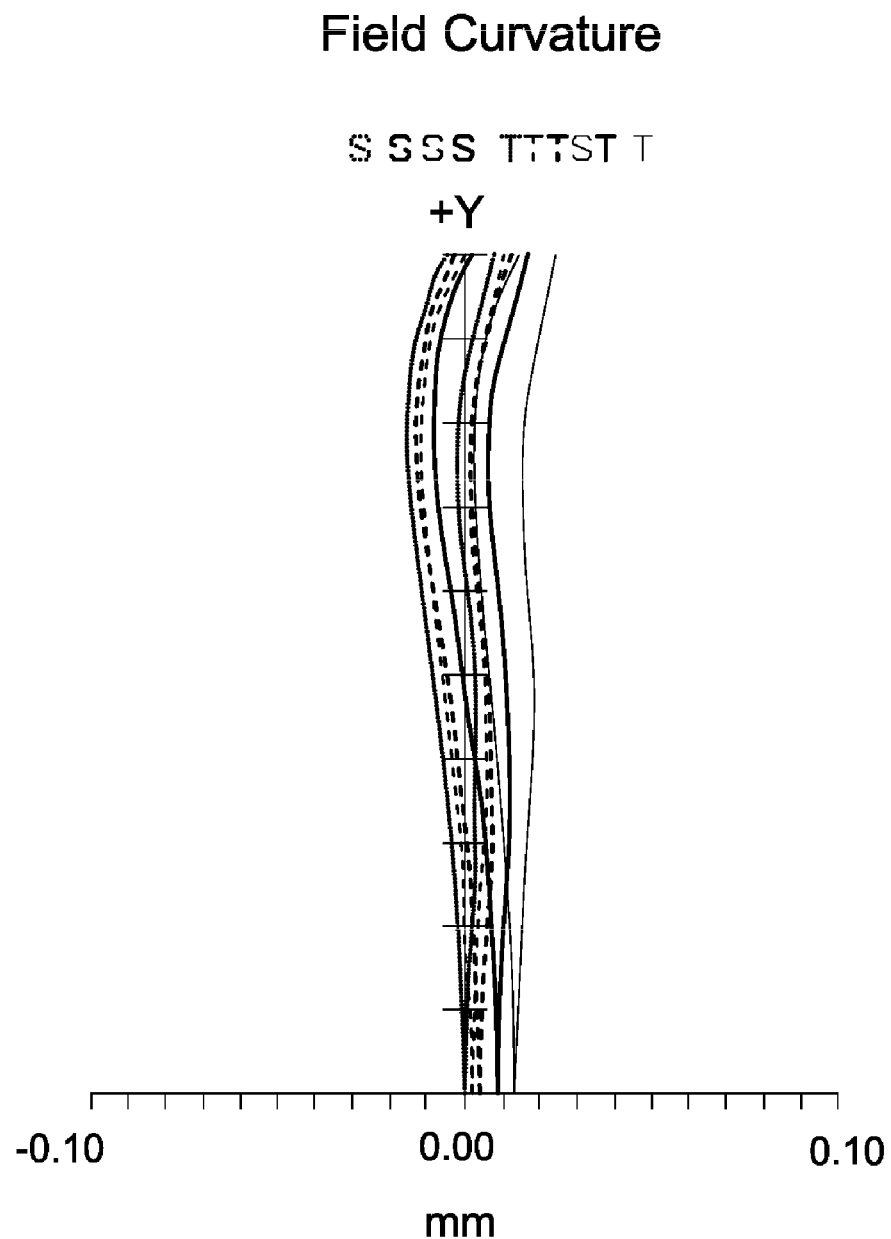
FIG. 2B is a field curvature diagram of the lens assembly in accordance with the first embodiment of the invention.

It can be seen from FIG. 2B that the field curvature of tangential direction and sagittal direction in the lens assembly 1 of the first embodiment ranges from −0.02 mm to 0.03 mm.

Figure 2C:
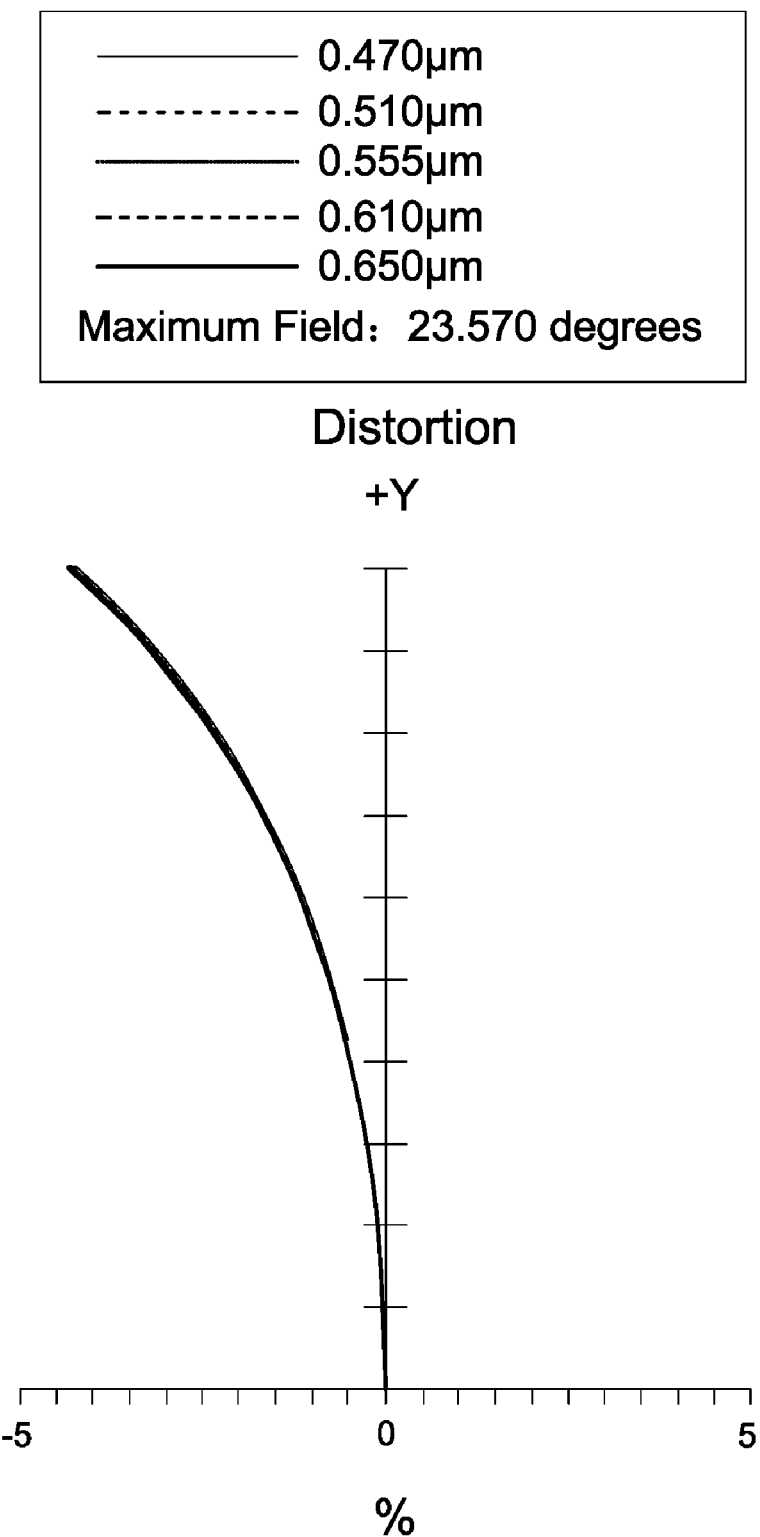
FIG. 2C is a distortion diagram of the lens assembly in accordance with the first embodiment of the invention.

It can be seen from FIG. 2C that the distortion in the lens assembly 1 of the first embodiment ranges from −5% to 0%.

Figure 2D:
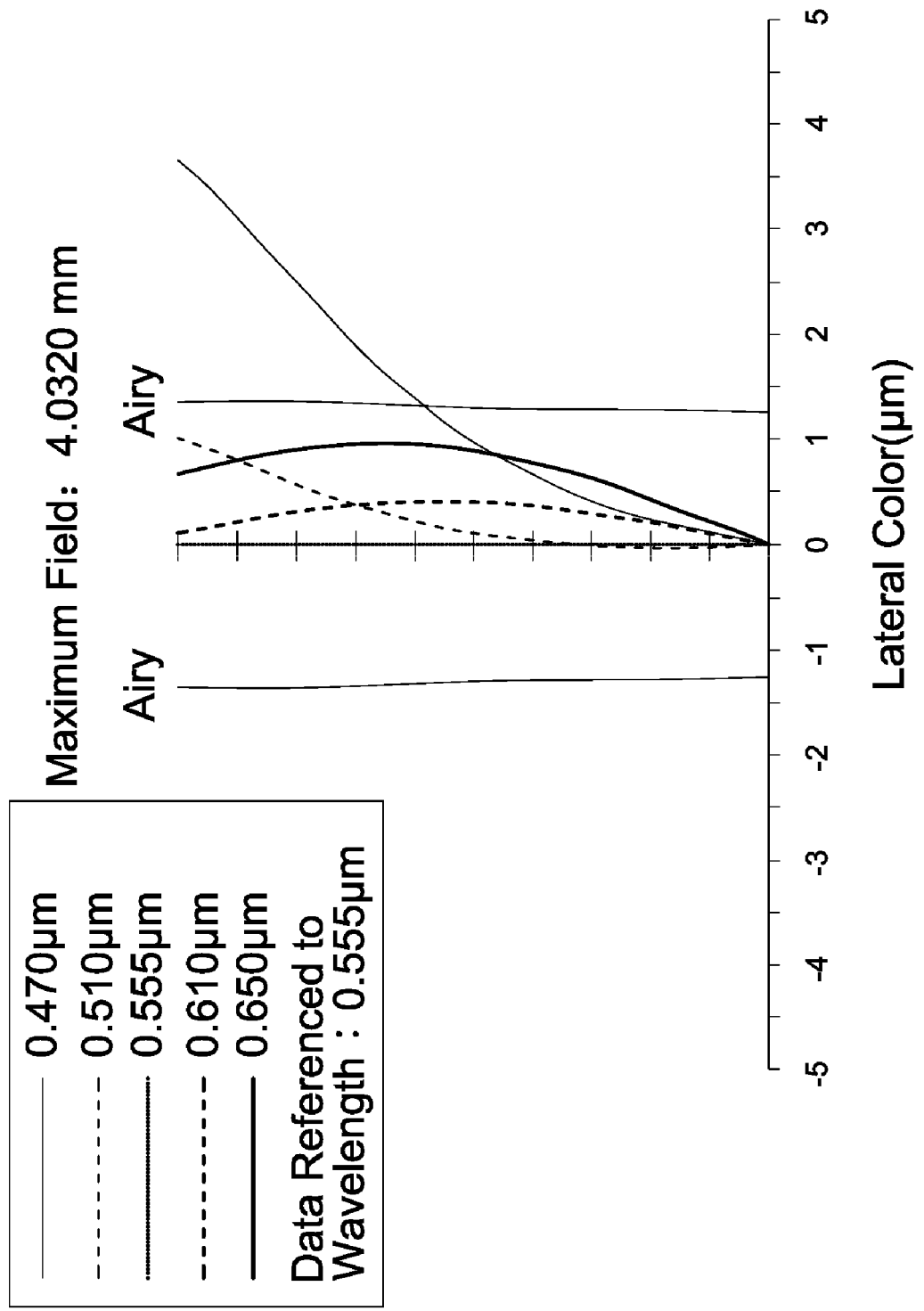
FIG. 2D is a lateral color diagram of the lens assembly in accordance with the first embodiment of the invention.

It can be seen from FIG. 2D that the lateral color in the lens assembly 1 of the first embodiment ranges from 0 μm to 4 μm.

It can be seen from FIG. 2E that the relative illumination in the lens assembly 1 of the first embodiment ranges from 0.84 to 1.0.

Figure 2F:
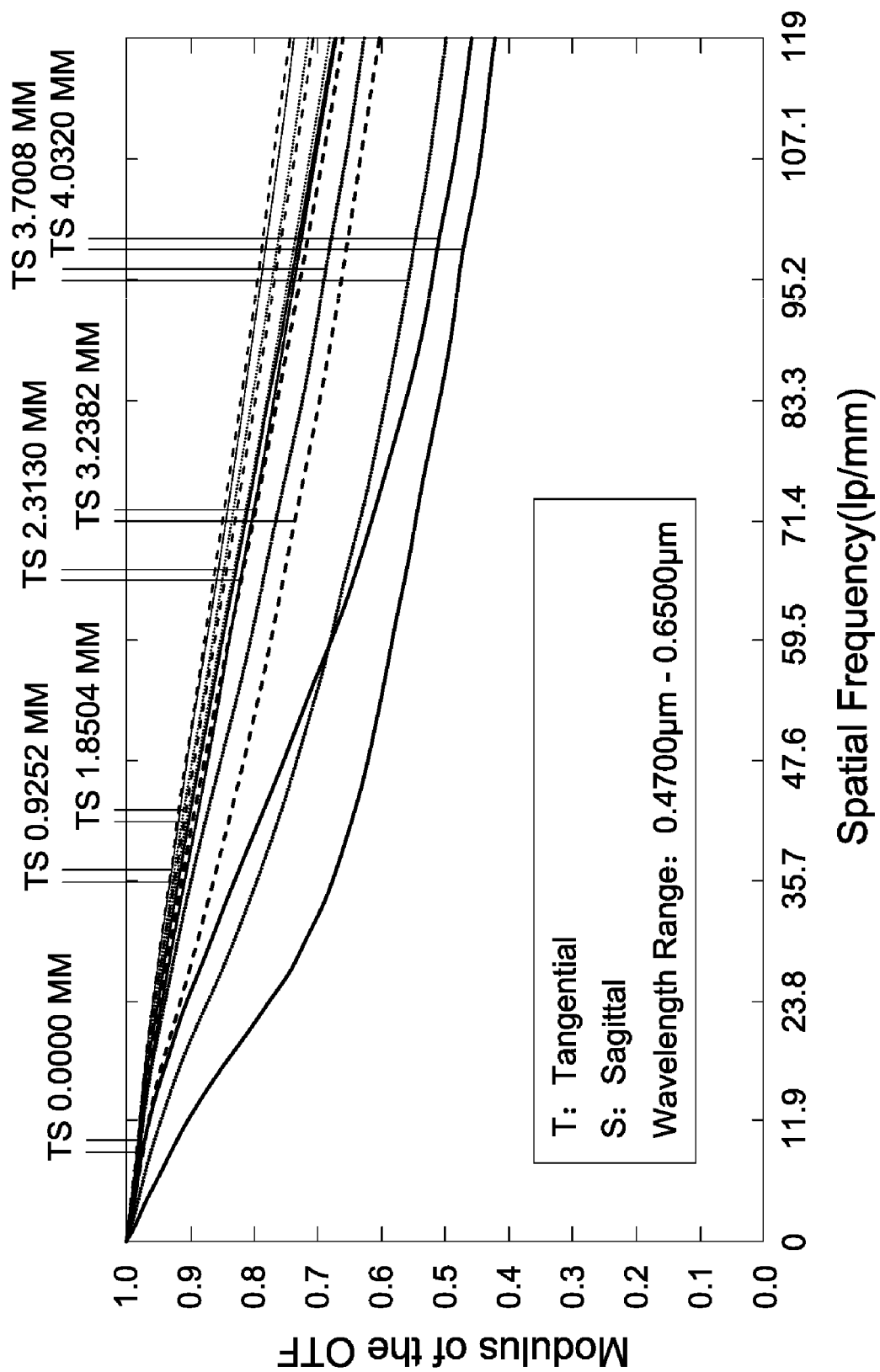
FIG. 2F is a modulation transfer function diagram of the lens assembly in accordance with the first embodiment of the invention.

It can be seen from FIG. 2F that the modulation transfer function of tangential direction and sagittal direction in the lens assembly 1 of the first embodiment ranges from 0.42 to 1.0.

Figure 2G:
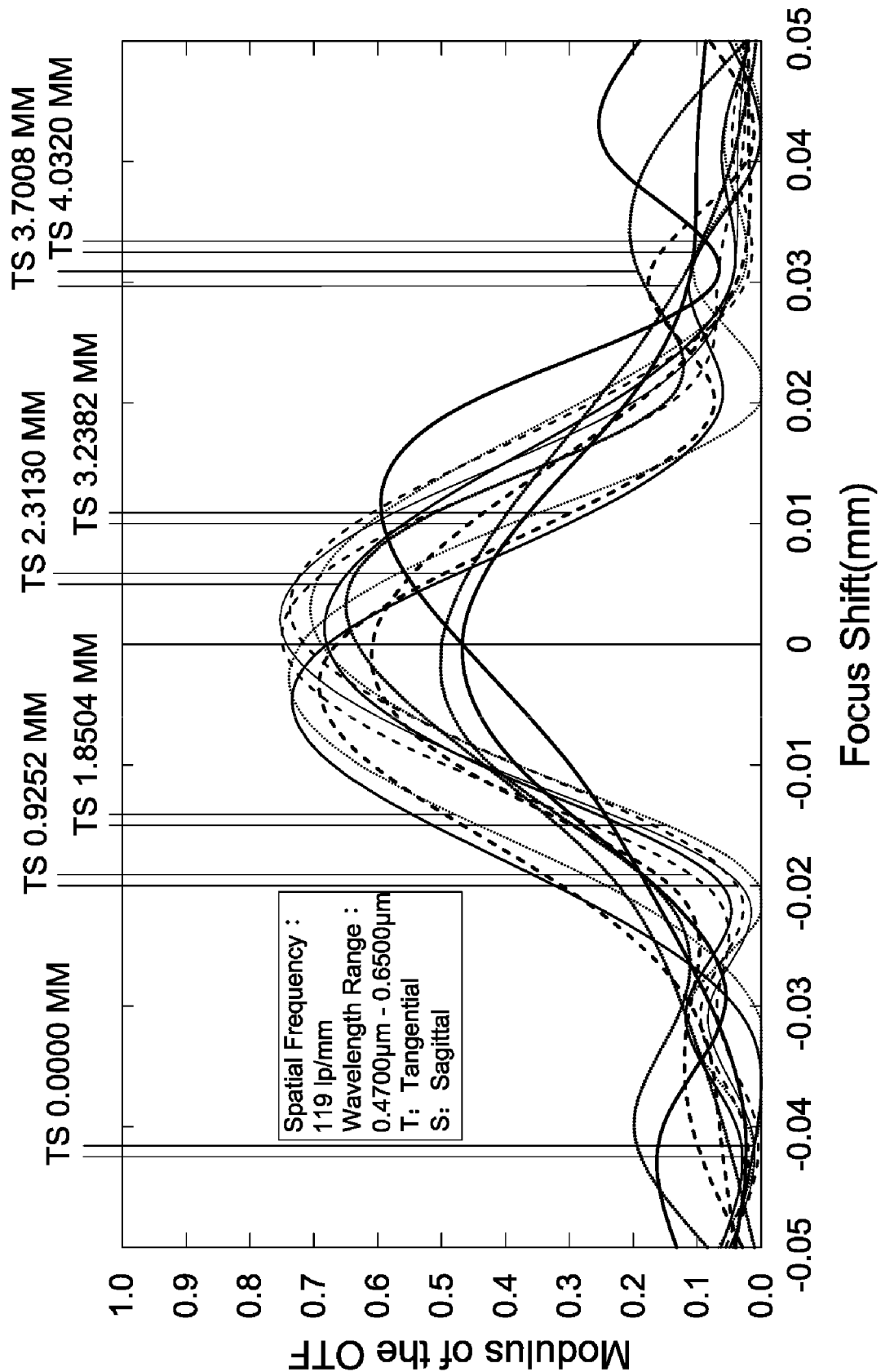
FIG. 2G is a through focus modulation transfer function diagram of the lens assembly in accordance with the first embodiment of the invention.

It can be seen from FIG. 2G that the through focus modulation transfer function of tangential direction and sagittal direction in the lens assembly 1 of the first embodiment ranges from 0 to 0.8 as focus shift ranges from −0.05 mm to 0.05 mm.

It is obvious that the longitudinal aberration, the field curvature, the distortion, and the lateral color of the lens assembly 1 of the first embodiment can be corrected effectively, and the relative illumination, the resolution and the depth of focus of the lens assembly 1 of the first embodiment can meet the requirement. Therefore, the lens assembly 1 of the first embodiment is capable of good optical performance.

Referring to FIG. 3, FIG. 3 is a lens layout diagram of a lens assembly in accordance with a second embodiment of the invention. The lens assembly 2 includes a first lens L21, a second lens L22, a third lens L23, a stop ST2, a fourth lens L24, a fifth lens L25, a sixth lens L26, a seventh lens L27, an optical filter OF2, and a cover glass CG2, all of which are arranged in order from an object side to an image side along an optical axis OA2. In operation, an image of light rays from the object side is formed at an image plane IMA2.

As described above, wherein: the surface profiles of the first lens L21 approximate to that of the first lens L11 of the lens assembly 1 of the first embodiment, and is not described here again; the second lens L22 is a meniscus lens, wherein the object side surface S23 is a concave surface and the image side surface S24 is a convex surface; the third lens L23 is a meniscus lens, wherein the object side surface S24 is a concave surface and the image side surface S25 is a convex surface; the surface profiles of the fourth lens L24 approximate to that of the fourth lens L14 of the lens assembly 1 of the first embodiment, and is not described here again; the fifth lens L25 is a meniscus lens, wherein the object side surface S29 is a convex surface and the image side surface S210 is a concave surface; the sixth lens L26 is a meniscus lens, wherein the object side surface S210 is a convex surface and the image side surface S211 is a concave surface; the surface profiles of the seventh lens L27 approximate to that of the seventh lens L17 of the lens assembly 1 of the first embodiment, and is not described here again; both of the object side surface S214 and image side surface S215 of the optical filter OF2 are plane surfaces; and both of the object side surface S216 and image side surface S217 of the cover glass CG2 are plane surfaces.

With the above design of the lenses and stop ST2 and at least any one of the conditions (1)-(7) satisfied, the lens assembly 2 can have an effective shortened total lens length, an effective decreased F-number, an effective increased resolution, an effective resisted environmental temperature change, and is capable of an effective corrected aberration.

Table 4 shows the optical specification of the lens assembly 2 in FIG. 3.

TABLE 4

| Effective Focal Length = 9.200 mm | | | F-number = 1.8 | | |
|---|---|---|---|---|---|
| Total Lens Length = 29.95 mm | | | Vertical Field of View = 26.7 Degrees | | |
| Surface Number | Radius of Curvature (mm) | Thickness (mm) | Nd | Vd | Effective Focal Length (mm) | Remark |
| S21 | 5.935455 | 0.888819 | 1.517 | 64.17 | −25.247 | The First Lens L21 |
| S22 | 3.87453 | 3.697298 | | | | |
| S23 | −5.48937 | 0.658235 | 1.548 | 45.78 | −11.232 | The Second Lens L22 |

TABLE 4-continued

| Effective Focal Length = 9.200 mm Total Lens Length = 29.95 mm | | | | F-number = 1.8 Vertical Field of View = 26.7 Degrees | | |
|---|---|---|---|---|---|---|
| Surface Number | Radius of Curvature (mm) | Thickness (mm) | Nd | Vd | Effective Focal Length (mm) | Remark |
| S24 | −51.1316 | 2.808523 | 1.835 | 42.73 | 12.121 | The Third Lens L23 |
| S25 | −8.68944 | −0.74054 | | | | |
| S26 | ∞ | 0.840471 | | | | Stop ST2 |
| S27 | 15.73434 | 2.373423 | 1.525 | 70.33 | 16.552 | The Fourth Lens L24 |
| S28 | −17.9498 | 0.1 | | | | |
| S29 | 8.601844 | 2.324459 | 1.835 | 42.73 | 11.823 | The Fifth Lens L25 |
| S210 | 57.06547 | 0.649943 | 1.923 | 20.88 | −8.653 | The Sixth Lens L26 |
| S211 | 7.019334 | 1.531214 | | | | |
| S212 | 24.06546 | 1.665795 | 1.678 | 54.89 | 18.960 | The Seventh Lens L27 |
| S213 | −26.6118 | 0.1 | | | | |
| S214 | ∞ | 0.3 | 1.517 | 64.17 | | Optical Filter OF2 |
| S215 | ∞ | 7.302542 | | | | |
| S216 | ∞ | 0.4 | 1.517 | 64.17 | | Cover Glass CG2 |
| S217 | ∞ | 0.05 | | | | |

The definition of aspheric surface sag z of each aspheric surface in table 4 is the same as that of in Table 1, and is not described here again.

In the second embodiment, the conic constant k and the aspheric coefficients A, B, C, D of each aspheric surface are shown in Table 5.

TABLE 5

| Surface Number | k | A | B | C | D |
|---|---|---|---|---|---|
| S27 | 1.62273 | 7.65E−02 | −2.41E−03 | −7.89E−05 | 3.44E−06 |
| S28 | −0.07646 | 2.70E−03 | −1.44E−05 | −5.82E−06 | 8.30E−08 |
| S212 | 17.773 | 0.0551 | −4.25E−05 | −3.33E−06 | 6.89E−08 |
| S213 | −50.9865 | 0.802 | −1.65E−02 | −2.89E−03 | 6.76E−04 |

Table 6 shows the parameters and condition values for conditions (1)-(7) in accordance with the second embodiment of the invention. It can be seen from Table 6 that the lens assembly 2 of the second embodiment satisfies the conditions (1)-(7).

TABLE 6

| BFL | 8.153 mm | | | | |
|---|---|---|---|---|---|
| $|f_2/f|$ | 1.22 | $|f_6/f|$ | 0.94 | $|f_1/f|$ | 2.74 |
| $|f_4/f|$ | 1.80 | $|f_7/f|$ | 2.06 | BFL/TTL | 0.33 |
| f/TTL | 0.37 | | | | |

By the above arrangements of the lenses and stop ST2, the lens assembly 2 of the second embodiment can meet the requirements of optical performance as seen in FIGS. 4A-4G.

Figure 4A:
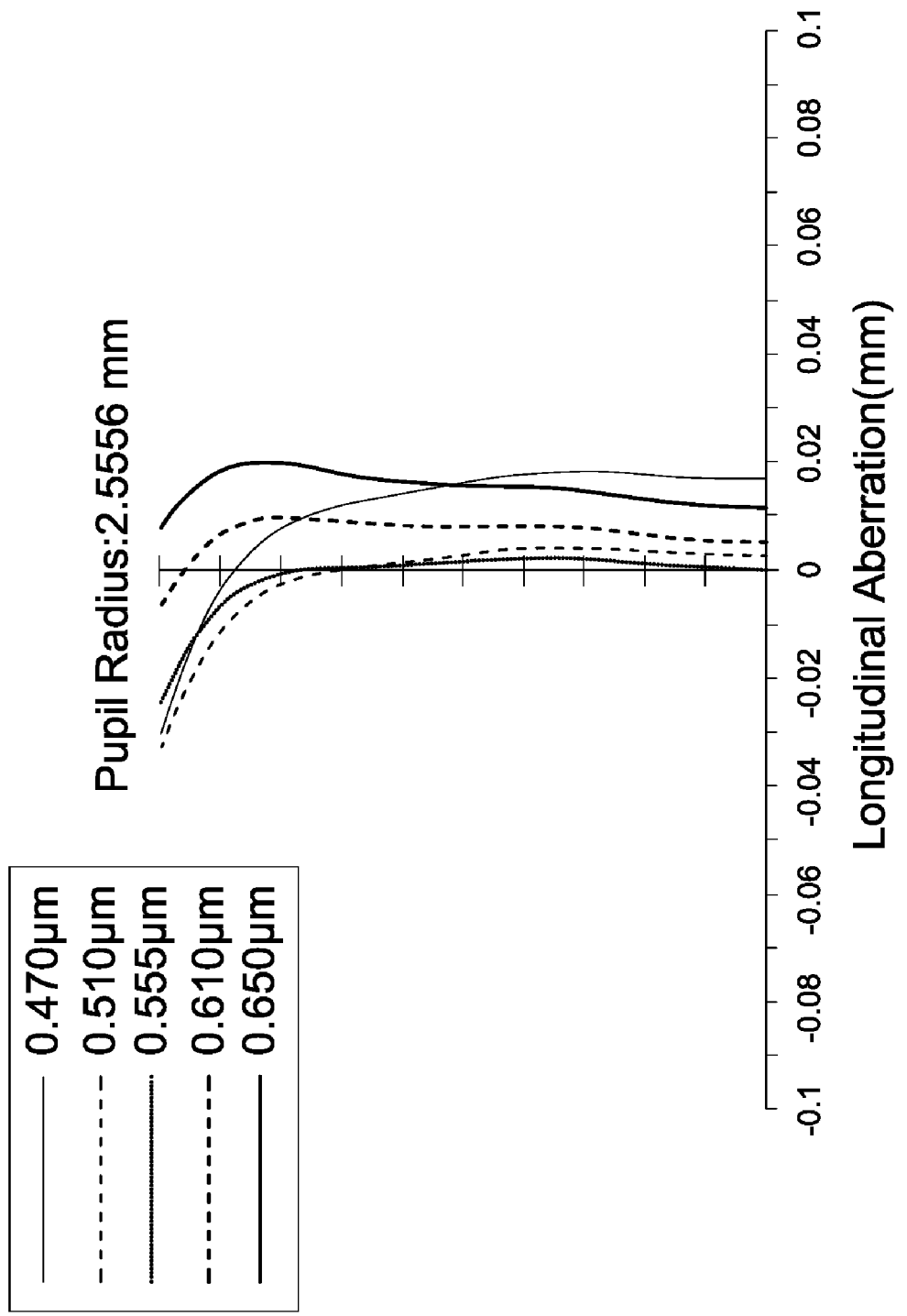
FIG. 4A depicts a longitudinal aberration diagram of the lens assembly in accordance with the second embodiment of the invention.

It can be seen from FIG. 4A that the longitudinal aberration in the lens assembly 2 of the second embodiment ranges from −0.04 mm to 0.02 mm.

Figure 4B:
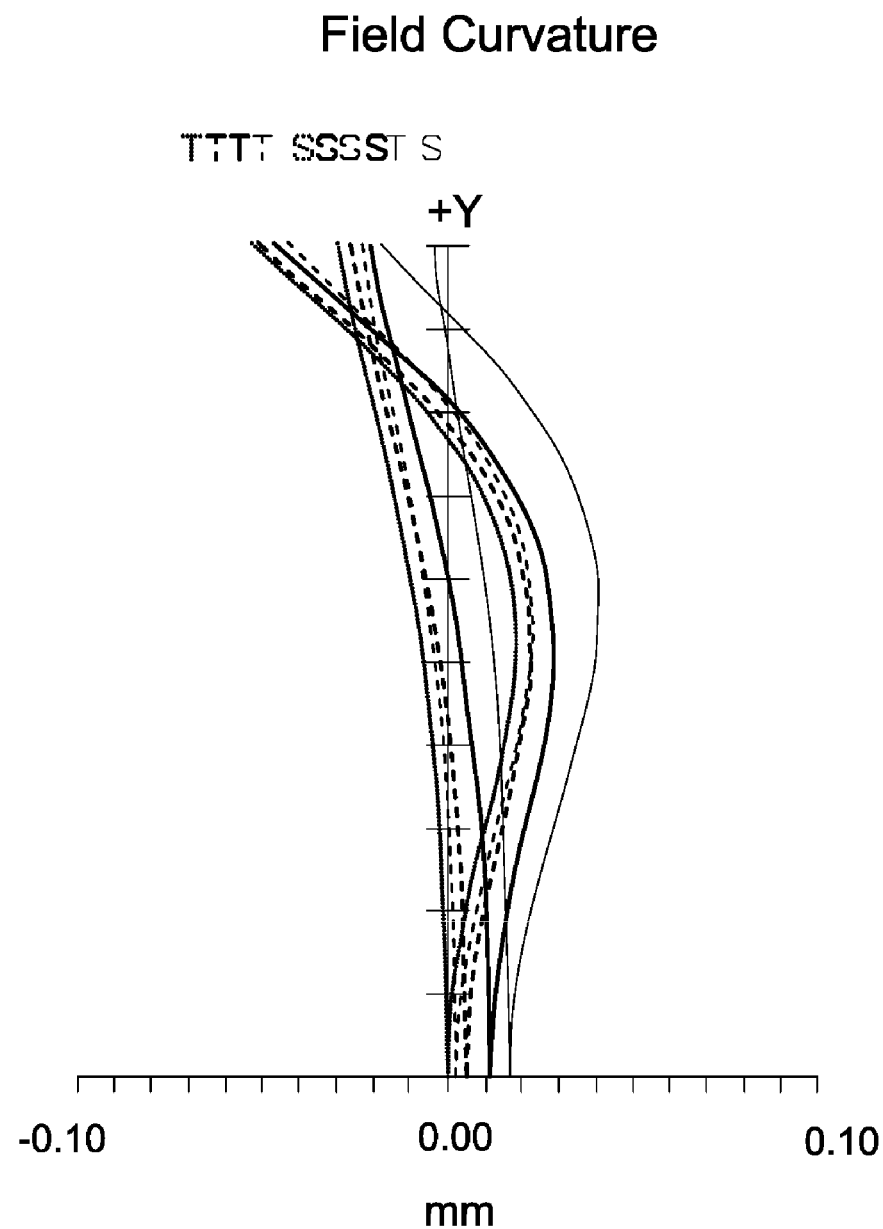
FIG. 4B is a field curvature diagram of the lens assembly in accordance with the second embodiment of the invention.

It can be seen from FIG. 4B that the field curvature of tangential direction and sagittal direction in the lens assembly 2 of the second embodiment ranges from −0.06 mm to 0.04 mm.

Figure 4C:
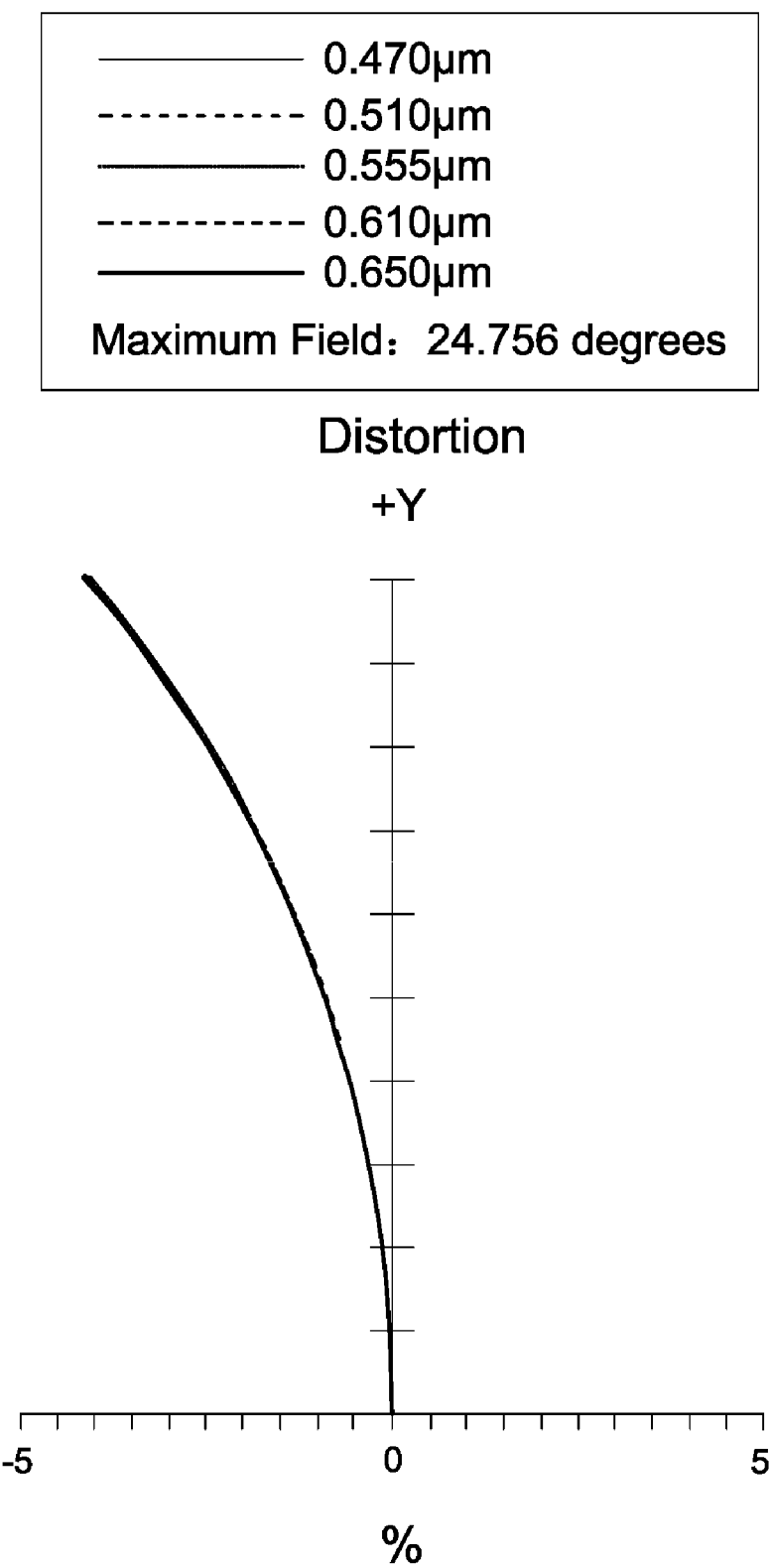
FIG. 4C is a distortion diagram of the lens assembly in accordance with the second embodiment of the invention.

It can be seen from FIG. 4C that the distortion in the lens assembly 2 of the second embodiment ranges from −5% to 0%.

It can be seen from FIG. 4D that the lateral color in the lens assembly 2 of the second embodiment ranges from −1 μm to 2.5 μm.

Figure 4E:
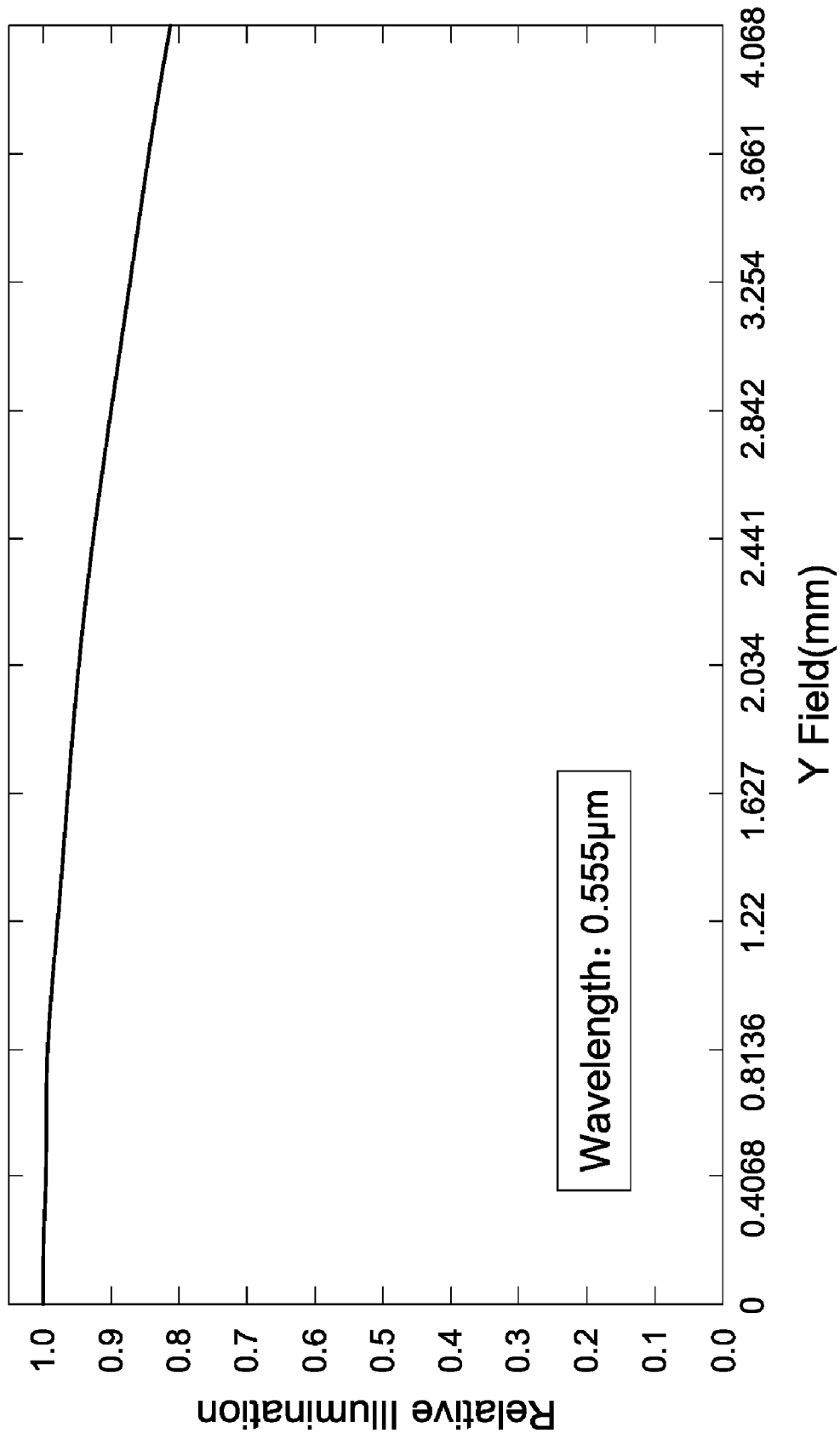
FIG. 4E is a relative illumination diagram of the lens assembly in accordance with the second embodiment of the invention

It can be seen from FIG. 4E that the relative illumination in the lens assembly 2 of the second embodiment ranges from 0.82 to 1.0.

Figure 4F:
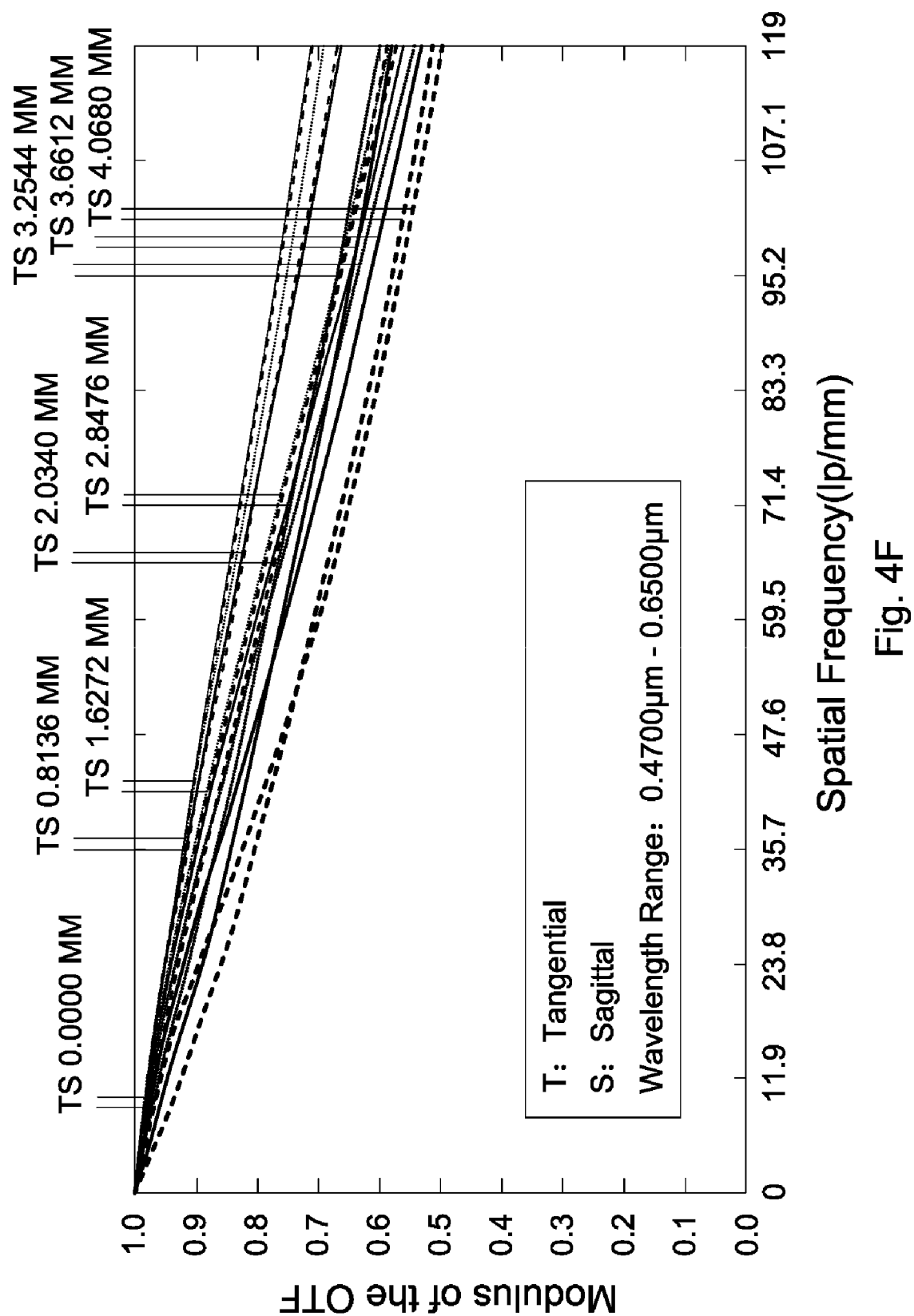
FIG. 4F is a modulation transfer function diagram of the lens assembly in accordance with the second embodiment of the invention.
Figure 4G:
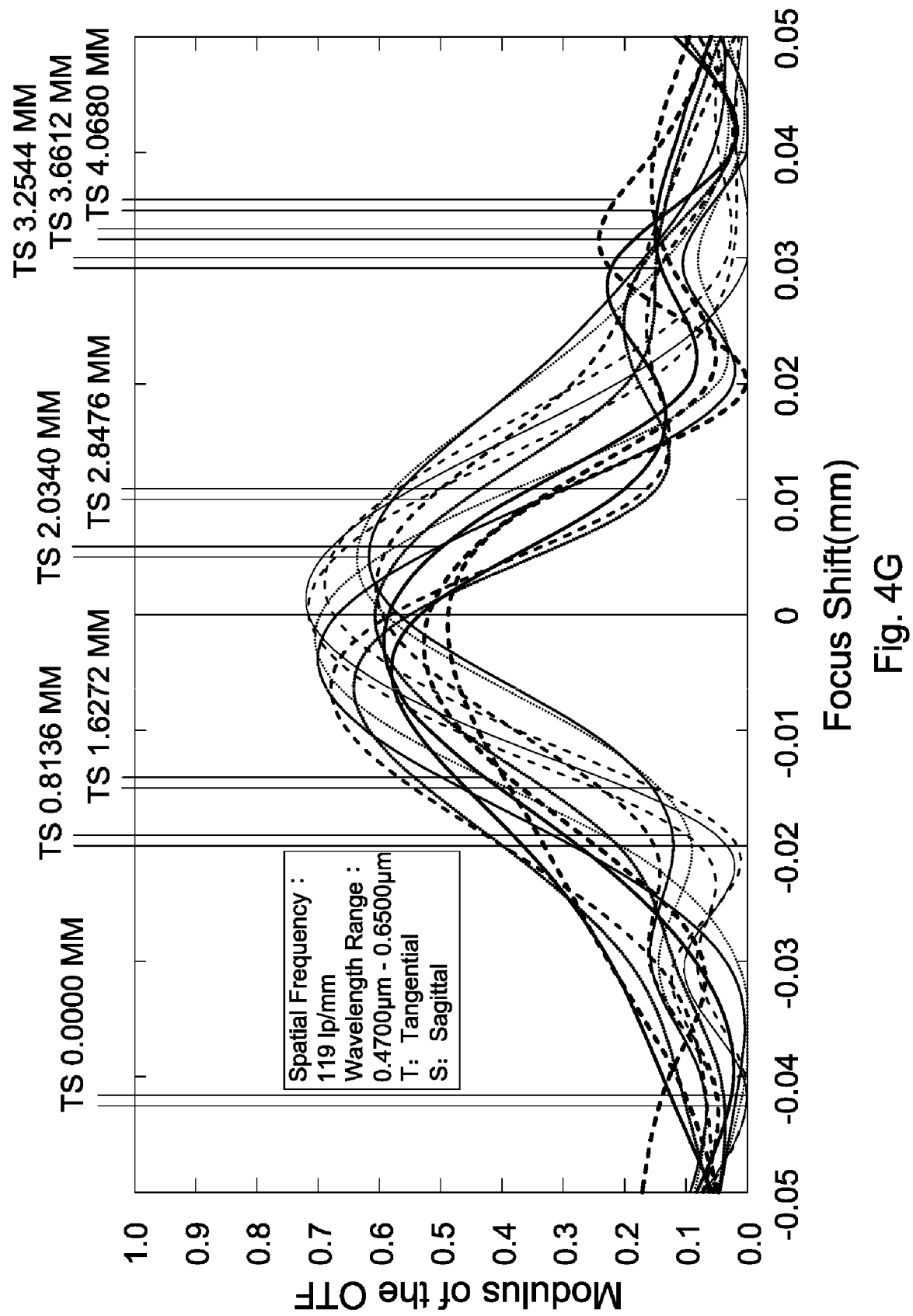
FIG. 4G is a through focus modulation transfer function diagram of the lens assembly in accordance with the second embodiment of the invention.

It can be seen from FIG. 4F that the modulation transfer function of tangential direction and sagittal direction in the lens assembly 2 of the second embodiment ranges from 0.50 to 1.0.

It can be seen from FIG. 2G that the through focus modulation transfer function of tangential direction and sagittal direction in the lens assembly 2 of the second embodiment ranges from 0 to 0.8 as focus shift ranges from −0.05 mm to 0.05 mm.

It is obvious that the longitudinal aberration, the field curvature, the distortion, and the lateral color of the lens assembly 2 of the second embodiment can be corrected effectively, and the relative illumination, the resolution and the depth of focus of the lens assembly 2 of the second embodiment can meet the requirement. Therefore, the lens assembly 2 of the second embodiment is capable of good optical performance.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A lens assembly comprising:
   a first lens which is with negative refractive power and comprises a convex surface facing an object side;
   a second lens which is with negative refractive power;
   a third lens which is with positive refractive power;

a fourth lens which is with positive refractive power;
a fifth lens which is with positive refractive power;
a sixth lens which is with negative refractive power; and
a seventh lens which is with positive refractive power and comprises a convex surface facing the object side;
wherein the first lens, the second lens, the third lens, the fourth lens, the fifth lens, the sixth lens, and the seventh lens are arranged in order from the object side to an image side along an optical axis;
wherein the second lens and the third lens are cemented;
wherein the lens assembly satisfies:

$0.3<f/TTL<0.4$;

wherein f is an effective focal length of the lens assembly and TTL is an interval from the convex surface of the first lens to an image plane along the optical axis.

2. The lens assembly as claimed in claim 1, wherein:
the first lens further comprises a concave surface facing the image side;
the second lens comprises a concave surface facing the object side;
the third lens comprises a convex surface facing the image side;
the fourth lens is a biconvex lens and comprises a convex surface facing the object side and another convex surface facing the image side;
the fifth lens comprises a convex surface facing the object side;
the sixth lens comprises a concave surface facing the image side; and
the seventh lens further comprises a convex surface facing the image side.

3. The lens assembly as claimed in claim 2, wherein:
the second lens further comprises another concave surface facing the image side;
the third lens further comprises another convex surface facing the object side;
the fifth lens further comprises another convex surface facing the image side; and
the sixth lens further comprises another concave surface facing the object side.

4. The lens assembly as claimed in claim 1, wherein the lens assembly satisfies:

$2.2<|f_1/f|<4.2$;

$0.1<|f_2/f|<2.2$;

$0.5<|f_4/f|<2.6$;

$0.3<|f_6/f|<1.2$;

$0.9<|f_7/f|<3.1$;

$0.1<BFL/TTL<0.4$;

wherein $f_1$ is an effective focal length of the first lens, $f_2$ is an effective focal length of the second lens, $f_4$ is an effective focal length of the fourth lens, $f_6$ is an effective focal length of the sixth lens, $f_7$ is an effective focal length of the seventh lens, f is an effective focal length of the lens assembly, BFL is an interval from an image side surface of the seventh lens to an image plane along the optical axis, and TTL is an interval from the convex surface of the first lens to the image plane along the optical axis.

5. A lens assembly comprising:
a first lens which is with negative refractive power and comprises a convex surface facing an object side;
a second lens which is with negative refractive power;
a third lens which is with positive refractive power;
a fourth lens which is with positive refractive power;
a fifth lens which is with positive refractive power;
a sixth lens which is with negative refractive power; and
a seventh lens which is with positive refractive power and comprises a convex surface facing the object side;
wherein the first lens, the second lens, the third lens, the fourth lens, the fifth lens, the sixth lens, and the seventh lens are arranged in order from the object side to an image side along an optical axis;
wherein the second lens and the third lens are cemented;
wherein the first lens further comprises a concave surface facing the image side, the second lens comprises a concave surface facing the object side, the third lens comprises a convex surface facing the image side, the fourth lens is a biconvex lens and comprises a convex surface facing the object side and another convex surface facing the image side, the fifth lens comprises a convex surface facing the object side, the sixth lens comprises a concave surface facing the image side, and the seventh lens further comprises a convex surface facing the image side;
wherein the second lens further comprises another concave surface facing the image side, the third lens further comprises another convex surface facing the object side, the fifth lens further comprises another convex surface facing the image side, and the sixth lens further comprises another concave surface facing the object side.

6. The lens assembly as claimed in claim 5, wherein the lens assembly satisfies:

$2.2<|f_1/f|<4.2$;

$0.1<|f_2/f|<2.2$;

$0.5<|f_4/f|<2.6$;

$0.3<|f_6/f|<1.2$;

$0.9<|f_7/f|<3.1$;

$0.1<BFL/TTL<0.4$;

wherein $f_1$ is an effective focal length of the first lens, $f_2$ is an effective focal length of the second lens, $f_4$ is an effective focal length of the fourth lens, $f_6$ is an effective focal length of the sixth lens, $f_7$ is an effective focal length of the seventh lens, f is an effective focal length of the lens assembly, BFL is an interval from an image side surface of the seventh lens to an image plane along the optical axis, and TTL is an interval from the convex surface of the first lens to the image plane along the optical axis.

* * * * *